United States Patent [19]

Suzuki et al.

[11] Patent Number: 4,647,507
[45] Date of Patent: Mar. 3, 1987

[54] MAGNETIC RECORDING MATERIAL

[75] Inventors: Takashi Suzuki, Takatsuki; Masaru Odagiri, Kawanishi; Yoshiaki Kai, Neyagawa; Hisayo Kitamaki, Hirakata; Akio Tomago, Suita, all of Japan

[73] Assignee: Matsushita Electric Industrial Co., Ltd., Osaka, Japan

[21] Appl. No.: 791,075

[22] Filed: Oct. 24, 1985

[30] Foreign Application Priority Data

Oct. 31, 1984 [JP] Japan .................................. 59-229416
Oct. 31, 1984 [JP] Japan .................................. 59-229418

[51] Int. Cl.$^4$ .............................................. G11B 5/72
[52] U.S. Cl. ..................................... 428/421; 360/134; 360/135; 360/136; 427/131; 428/422; 428/694; 428/695; 428/900
[58] Field of Search ............... 428/694, 695, 422, 421, 428/900; 427/131; 252/62.54; 360/134–136

[56] References Cited

U.S. PATENT DOCUMENTS

| 4,007,313 | 2/1977 | Higuchi | 428/900 |
| 4,268,556 | 5/1981 | Pedrotty | 428/695 |
| 4,368,239 | 1/1983 | Nakajima | 428/695 |
| 4,505,990 | 3/1985 | Dasgupta | 428/694 |
| 4,529,659 | 7/1985 | Hashino | 428/422 |
| 4,536,444 | 8/1985 | Sumiya | 428/694 |

Primary Examiner—Ellis P. Robinson
Attorney, Agent, or Firm—Stevens, Davis, Miller & Mosher

[57] ABSTRACT

A magnetic recording medium wherein a thin layer comprising an organic compound having at least one carboxyl or mercapto group, at least one fluoroalkyl group having 3 or more carbon atoms and at least one aliphatic alkyl group having 8 or more carbon atoms on its molecular terminals is formed on an oxygen-containing thin film of a ferromagnetic metal.

The magnetic recording medium of the present invention is suitable for use as the magnetic recording media of magnetic tape, magnetic disk and the like and most suitable for use in rotating head type video tape recorders.

1 Claim, 1 Drawing Figure

F I G. I
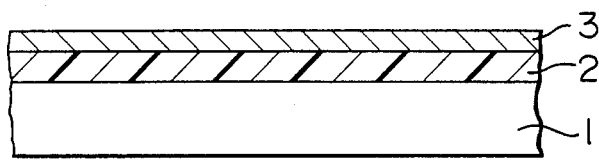

MAGNETIC RECORDING MATERIAL

INDUSTRIAL UTILIZABILITY

The present invention relates to a magnetic recording medium suitable for use as the magnetic recording media of magnetic tape, magnetic disk and the like and most suitable for use in rotating head type video tape recorders.

CONSTRUCTIONS OF PRIOR ARTS AND THEIR PROBLEMS INVOLVED

Ferromagnetic metal film type magnetic recording media wherein a film of iron, cobalt, nickel or alloy thereof is formed on a substrate composed of a polymer film such as polyester film, polyimide film and the like or a thin plate of non-magnetic metal by the vacuum film-forming process such as vacuum vapor deposition, spattering, ion plating, etc. have a merit that they can realize a much higher record density than on the prior magnetic recording media of coating type. However, such an enhancement of record density is possible only by flattening the surface of magnetic recording medium and decreasing the spacing loss between magnetic head and magnetic recording medium as possible. However, an excessively flatten surface is also undesirable, because it can causes some troubles with regard to head touch and running property of recording medium, which must be avoided by giving the surface a fine roughness and, at the same time, providing a surface coating containing various organic lubricants. As the organic lubricant, various fatty acids, fatty acid esters, fatty acid amides, silicone oils, fluorinated oils and the like have hitherto been used either in the form of single material or in the form of various composite materials. However, a study of the present inventors has revealed that the still image regeneration life of this type of magnetic recording media is as short as 30 minutes or less and in extreme cases only a few minutes or less when the ambient temperature is lower than 5° C., although the life is 30 minutes or longer at temperatures not lower than ordinary temperature (10° C. to 30° C.).

OBJECT OF THE INVENTION

An object of the present invention consists in solving the above-mentioned problem by providing a thin film type magnetic recording medium having a long still image regeneration life at low temperatures.

CONSTRUCTION OF THE INVENTION

The present invention relates to a magnetic recording medium characterized by forming, on an oxygen-containing thin film of ferromagnetic metal, a thin layer comprising an organic compound having, on its molecular terminals, one carboxyl or mercapto group, one fluoroalkyl group having 3 or more carbon atoms and one aliphatic alkyl group having 8 or more carbon atoms. In the invention, the co-existence of the fluoroalkyl group and the aliphatic alkyl group brings about a stable lubricating action on the one hand, and the carboxyl or mercapto group exercises a strong reactive force on the oxide layer of the surface of the ferromagnetic metal thin film on the other hand, and said lubricating action and said reactive force act synergistically each other, owing to which the still image regeneration life at low temperatures is prolonged.

BRIEF DESCRIPTION OF THE DRAWING

In FIG. 1, 1 is substrate, 2 is thin film of ferromagnetic metal, and 3 is surface coating layer.

DETAILED DESCRIPTION OF THE INVENTION

The surface coating layer 3 is constructed of a thin layer comprising an organic compound having, on its molecular terminals, at least one carboxyl or mercapto group, at least one fluoroalkyl group having 3 or more carbon atoms and at least one aliphatic alkyl group having 8 or more carbon atoms.

Examples of the organic compound having a fluoroalkyl group (hereinafter referred to as $R_f$), an aliphatic alkyl group (hereinafter referred to as R) and a carboxyl group used in the invention include the followings:

Derivatives of polyhydric alcohol esters:

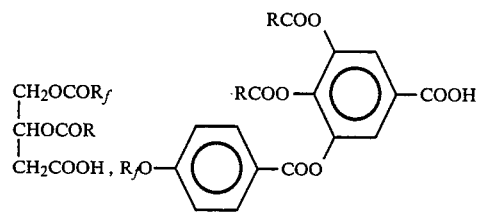

Derivatives of bromo fatty acids or hydroxy fatty acids:

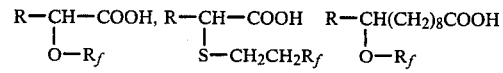

Derivatives of unsaturated fatty acids:

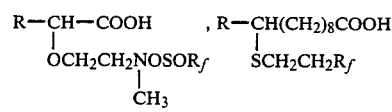

Derivatives of alkylamines:

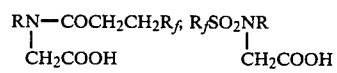

Derivatives of alkylsuccinic acids:

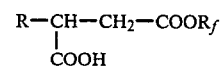

and the like. Examples of the organic compound having a fluoroalkyl group, an aliphatic alkyl group and a mercapto group used in the invention include the followings:

Derivatives of polyhydric alcohol esters:

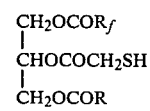

-continued

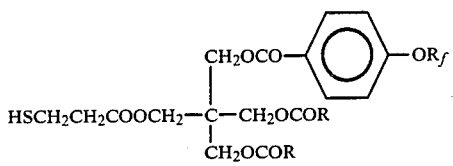

Derivatives of mercapto fatty acids:

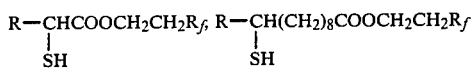

Derivatives of thiocarboxylic acids (thiomalic acid, α-methylthiomalic acid, thiosuccinic acid, thiophthalic acid, and the like):

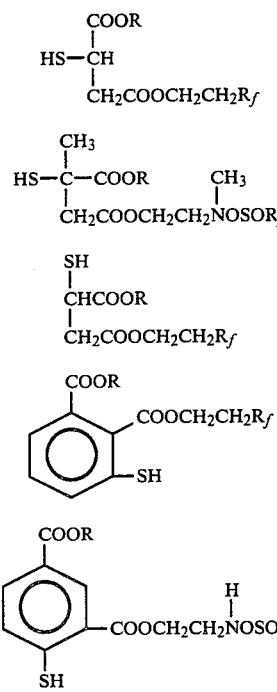

Derivatives of mercaptoamino-carboxylic acids (cysteine and the like):

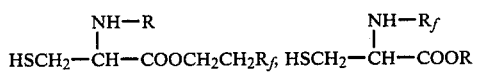

and the like. As said fluoroalkyl group, straight or branched chain perfluoroalkyl groups having 3 or more, preferably 5 or more, carbon atoms and straight chain fluoroalkyl groups having 3 or more, preferably 5 or more, carbon atoms and having one hydrogen atom on the terminal carbon atom (e.g. $HCF_2CF_2CF_2CF_2CF_2-$) are suitable for use. When the number of carbon atoms is 2 or less, the still image regeneration life is short. As said aliphatic alkyl group, straight or branched chain alkyl groups having 8 or more, preferably 10 or more, carbon atoms are suitable for use. When the number of carbon atom is 7 or less, the still image regeneration life is short. The organic compound used in the invention must have at least one fluoroalkyl group, at least one aliphatic alkyl group and at least one carboxyl or mercapto group as its terminal groups in one molecule. If plural organic compounds having only one or two of the above-mentioned terminal groups are mixed together to provide the three terminal groups as a whole, it is difficult to achieve the same effect as that of the present invention. Each of the above-mentioned terminal groups may be provided in a plural number in one molecule. It is also allowable to provide both carboxyl group and mercapto group in one molecule. It is also allowable that the molecule additionally contains terminal groups other than above such as hydrocarbon groups having 7 or less carbon atoms (e.g. $CH_3-$, $C_2H_5-$ and the like), fluoroalkyl groups having 2 or less carbon atoms (e.g. $HCF_2-$, $C_2F_5-$ and the like), etc.

Preferably, the organic compound used in the invention has a molecular weight of 3,000 or lower and particularly 2,000 or lower. If the molecular weight is higher than 3,000, the output is instable upon regenerating the still image.

Preferably, the proportions of the terminal groups in the organic compound are in the following ranges: fluoroalkyl group having 5 or more carbon atoms 10 to 80%, aliphatic alkyl group having 8 or more carbon atoms 10 to 80%, carboxyl group 3 or 20% (or mercapto group 2 to 15%). If the proportions are out of these ranges, the effect of improving the still image regeneration life at low temperatures is difficult to achieve.

Recommendably, the organic compound is placed on the ferromagnetic metal film in a proportion of 0.1 to 500 mg, preferably 0.5 to 200 mg, per 1 $m^2$ of the surface, either in itself alone or in the form of a composite material with other lubricant, rust-proofing agent, resin, etc. As the method for placing the organic compound, a direct coating or a vapor deposition of the organic compound onto the surface of ferromagnetic metal thin film, as well as a method which comprises coating or vapor-depositing the organic compound onto the backside of a magnetic recording medium and transferring it to the surface of ferromagnetic metal thin film at the time of lamination (winding), is employable.

As the ferromagnetic metal thin film, metallic thin films composed mainly of a metal such as Co, Ni, Fe and the like or an alloy thereof such as Co-Ni, Co-Cr and the like which can be formed either by oblique vapor deposition process or by vertical vapor deposition process are used, and the metallic thin film should contain oxygen which can be introduced into the thin film by carrying out the film-formation in an atmosphere composed mainly of oxygen gas. The content of the oxygen in the metallic thin film should be at least 3%, preferably at least 5%, as expressed by the atom number ratio to the ferromagnetic metal. If the content of oxygen is lower than 3%, no effect of improving the still image regeneration life at low temperature is achievable.

As the substrate on which the ferromagnetic metal thin film is to be formed, those excellent in the macroscopic surface flatness and having fine projections are suitable for use. For example, a polyester film having wavy or mountain-like projections (50 to 600 Å in height) at a mean density of $1 \times 10^4$ to $1 \times 10^8$ per 1 $mm^2$ is particularly preferable.

EXAMPLES

On the surface of a polyester film scarcely containing the fine particulate residue of polymerization catalyst, a modified silicone emulsion containing a thickener was coated and cured in the process of stretching film-formation to form wavy projections (100 Å in height, projection density $1 \times 10^6/1$ mm$^2$ surface). On the coating layer thus prepared, a thin film of ferromagnetic Co-Ni alloy (Ni content 20%, film thickness 1,000 Å) was formed by continuous vacuum oblique vapor deposition process in the presence of a minute quantity of oxygen. The oxygen content in the film was 5% as expressed in terms of atom number ratio. Hereinafter, this sample is referred to as "sample A".

Apart from above, fine particles of silica were added to a polyester film to form gently sloped particle-formed projections (mean height 70 Å, mean diameter 1 μm) at a density of several projections per 100 μm$^2$ surface, provided that the greater projections due to the particles of residual polymerization catalyst were decreased as possible. On the surface of this polyester film thus obtained, mountain-like steep projections were formed at a density of $1 \times 10^7$ per 1 mm$^2$ surface by using colloidal silica particles (150 Å in diameter) as nuclei and a ultraviolet-curable epoxy resin as a binder to prepare a base. On this base, a Co—Ni film (Ni content 20%, film thickness 1,000 Å, oxygen content 7%) was formed under the same conditions as above to prepare a second sample. Hereinafter, it is referred to as "sample B". Apart from above, a sample similar to B except for introducing no oxygen at the time of vapor deposition was prepared. This sample was the same as B, except that its oxygen content was lower than 2%. Hereinafter, this comparative sample is referred to as "sample C". The vapor-deposition films prepared above were coated with solutions of various organic compounds previously synthesized, after which they were cut into a predetermined width to form magnetic tapes. The tapes were worked by means of a tentative video-deck at a temperature of $-5°$ C. to measure their still image regeneration characteristics. The period of time required for lowering the output signal by 10 dB from the initial value was taken as the still image regeneration life. The results are summarized in Table 1. Among the comparative samples, (13) and (22) are samples in which the organic compound has no fluoroalkyl group in its molecular structure; (12) and (23) are samples in which the organic compound has no aliphatic alkyl group; (24), (25) and (26) are samples in which the organic compound has no carboxyl group or no mercapto groupl and (7) and (20) are samples in which the magnetic film has a low oxygen content.

TABLE 1

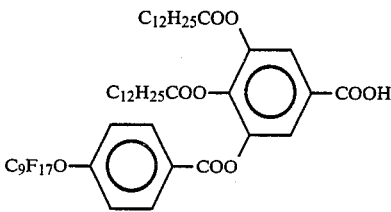

| Example No. ( ) means comparative example | Organic compound used | Magnetic layer | Amount of organic compound on magnetic layer (mg/m$^2$) | Still image regeneration life (minutes) |
| --- | --- | --- | --- | --- |
| 1 | CH$_2$OCOC$_5$F$_{11}$<br>\|<br>CHOCOC$_{12}$H$_{25}$<br>\|<br>CH$_2$COOH | A | 5 | >30 |
| 2 | (aromatic compound with C$_{12}$H$_{25}$COO, C$_{12}$H$_{25}$COO, C$_9$F$_{17}$O, COOH, COO substituents on two phenyl rings) | A | 10 | >30 |
| 3 | C$_{18}$H$_{37}$—CH—COOH<br>\|<br>O—C$_8$F$_{17}$ | B | 5 | >30 |
| 4 | C$_{18}$H$_{37}$—CH—COOH<br>\|<br>S—CH$_2$CH$_2$C$_8$F$_{17}$ | B | .5 | >30 |
| 5 | C$_8$H$_{17}$—CH(CH$_2$)$_8$COOH<br>\|<br>OC$_8$F$_{17}$ | B | 10 | >30 |
| 6 | C$_{18}$H$_{37}$—CH—COOH<br>\|<br>OCH$_2$CH$_2$NOSOC$_8$F$_{17}$<br>\|<br>CH$_3$ | A | 5 | >30 |
| (7) | " | C | 5 | 20 |
| 8 | C$_8$H$_{17}$—CH(CH$_2$)$_8$COOH<br>\|<br>SCH$_2$CH$_2$C$_8$F$_{17}$ | B | 10 | >30 |
| 9 | C$_{12}$H$_{25}$N—COCH$_2$CH$_2$C$_8$F$_{17}$<br>\|<br>CH$_2$COOH | B | 10 | >30 |

TABLE 1-continued

| Example No. ( ) means comparative example | Organic compound used | Magnetic layer | Amount of organic compound on magnetic layer (mg/m²) | Still image regeneration life (minutes) |
|---|---|---|---|---|
| 10 | $C_8F_{17}SO_2NC_{18}H_{37}$<br>          \|<br>          $CH_2COOH$ | A | 10 | >30 |
| 11 | $C_{12}H_{25}-CH-CH_2-COO(CF_2)_9H$<br>           \|<br>           $COOH$ | A | 5 | >30 |
| (12) | $CH_2OCOC_5F_{11}$<br>\|<br>$CHOCOC_5F_{11}$<br>\|<br>$CH_2COOH$ | B | 5 | 10 |
| (13) | $C_{12}H_{25}COO$-C₆H₃($COOH$)-$OOCC_{12}H_{25}$ | B | 5 | 6 |
| 14 | $CH_2OCOC_8F_{17}$<br>\|<br>$CHOCOCH_2SH$<br>\|<br>$CH_2OCOC_{12}H_{25}$ | A | 5 | >30 |
| 15 | $HSCH_2CH_2COOCH_2-C(CH_2OCO-C_6H_4-OC_9F_{17})(CH_2OCOC_{17}H_{35})-CH_2OCOC_{17}H_{35}$ | B | 5 | >30 |
| 16 | $C_{12}H_{23}CHCOOCH_2CH_2C_8F_{17}$<br>    \|<br>    SH | B | 10 | >30 |
| 17 | SH<br>\|<br>$CHCOOC_{18}H_{37}$<br>\|<br>$CH_2COOCH_2CH_2C_8H_{37}$ | B | 10 | >30 |
| 18 | $C_6H_4($COOC_8H_{17}$)($COOCH_2CH_2CF_2CF_2CF_2CF_2CF_2H$)($SH$) | A | 5 | >30 |
| 19 | $C_6H_4($COOC_{12}H_{25}$)($COOCH_2CH_2NHOSOC_8H_{17}$)($SH$) | A | 5 | >30 |
| (20) | " | C | 5 | 18 |
| 21 |      $NHC_8H_{17}$<br>     \|<br>$HSCH_2-CH-COOCH_2CH_2C_8F_{17}$ | B | 10 | >30 |
| (22) | $COOC_8H_{17}$<br>\|<br>$HSCH$<br>\|<br>$CH_2COOC_8H_{17}$ | B | 10 | 9 |

TABLE 1-continued

| Example No. ( ) means comparative example | Organic compound used | Magnetic layer | Amount of organic compound on magnetic layer (mg/m$^2$) | Still image regeneration life (minutes) |
|---|---|---|---|---|
| (23) | HSCH$_2$—CH(NH$_2$)—COOCH$_2$CH$_2$C$_8$F$_{17}$ | A | 10 | 14 |
| (24) | C$_6$H$_4$(COOC$_{12}$H$_{25}$)(COOCH$_2$CH$_2$C$_8$F$_{17}$) | A | 10 | 8 |
| (25) | C$_{17}$H$_{35}$COOC$_{18}$H$_{37}$ | B | 10 | 2 |
| (26) | C$_{12}$H$_{25}$COOCH$_2$CH$_2$C$_8$F$_{17}$ | A | 5 | 5 |

EFFECT OF THE INVENTION

It is apparent from the results presented above that the magnetic recording medium of the present invention have a long and stable still image regeneration life at low temperatures and therefore have a very high practical value.

What is claimed is:

1. A magnetic recording medium wherein a thin layer comprising an organic compound of molecular weight of not greater than 3,000 having one carboxyl or mercapto group, at least one fluoroalkyl group having 3 or more carbon atoms and at least one aliphatic alkyl group having 8 or more carbon atoms on its molecular terminals is formed on an oxygen-containing thin film of a ferromagnetic metal.

* * * * *